United States Patent [19]

Sugawara

[11] Patent Number: 4,946,252
[45] Date of Patent: Aug. 7, 1990

[54] FOCUSING SCREEN

[75] Inventor: Saburo Sugawara, Tokyo, Japan

[73] Assignee: Asahi Kogaku Kogyo Kabushiki Kaisha, Tokyo, Japan

[21] Appl. No.: 228,097

[22] Filed: Aug. 4, 1988

[30] Foreign Application Priority Data

Aug. 5, 1987 [JP] Japan ................. 62-194379

[51] Int. Cl.⁵ ................. G02B 3/08
[52] U.S. Cl. ................. 350/167; 350/431; 350/451
[58] Field of Search ................. 350/167, 431, 451

[56] References Cited

U.S. PATENT DOCUMENTS

| | | | |
|---|---|---|---|
| 1,922,932 | 5/1930 | Delano | 350/167 |
| 2,275,602 | 10/1938 | Beck et al. | 350/431 |
| 2,589,014 | 3/1952 | McLeod | 887/1.5 |
| 2,605,434 | 7/1952 | Homrighous | 350/167 |
| 4,703,405 | 10/1987 | Lewin | 350/167 |
| 4,878,737 | 11/1989 | Ise | 350/167 |

FOREIGN PATENT DOCUMENTS

| | | | |
|---|---|---|---|
| 2656173 | 6/1978 | Fed. Rep. of Germany | 350/167 |
| 52-27634 | 3/1977 | Japan . | |
| 55-50228 | 4/1980 | Japan . | |
| 55-70827 | 5/1980 | Japan . | |
| 55-111931 | 8/1980 | Japan . | |
| 57-13401 | 1/1982 | Japan . | |
| 57-13402 | 1/1982 | Japan . | |
| 57-13436 | 1/1982 | Japan . | |
| 57-30823 | 2/1982 | Japan . | |
| 57-41621 | 3/1982 | Japan . | |
| 57-157203 | 9/1982 | Japan . | |
| 58-189330 | 11/1983 | Japan . | |
| 59-189329 | 10/1984 | Japan . | |
| 60-184231 | 9/1985 | Japan . | |
| 8700908 | 2/1987 | PCT Int'l Appl. | 350/167 |

OTHER PUBLICATIONS

"Applications of Micro Structured Optics in Single Lens Reflex Camera" by Takashi Suzuki, Susumu Matsumura, Kiyoshi Iizuka and Kiyonobu Endo, Optics 1981 vol. 10.

*Primary Examiner*—Bruce Y. Arnold
*Assistant Examiner*—Terry S. Callaghan
*Attorney, Agent, or Firm*—Sughrue, Mion, Zinn, Macpeak & Seas

[57] ABSTRACT

An improved focusing screen for a single-lens reflex camera or the like in which an unpleasant sensation caused by dark spots on the screen is eliminated. The inventive focusing screen includes a plurality of small lenses formed on the surface of the screen, each being a composite lens composed of a concave portion lens and a convex lens portion. The lenses may be disposed in such a way as to form a honeycomb pattern.

7 Claims, 15 Drawing Sheets

FOCUSING SCREEN

BACKGROUND OF THE INVENTION

The present invention relates to a focusing screen for use in a single-reflex lens camera, a camera with an electronic shutter, a TV camera, or other types of cameras.

In taking pictures with a camera, the operator focuses the camera while looking at the image formed on a focusing screen via an optical system including imaging lenses. The focusing screen, which has a large number of light diffusing asperities on its surface, is conventionally made of ground glass or has many small lenses arranged in a regular or cyclic pattern. In the latter type of focusing screens, the surfaces of the small lenses are made spherical or in the shape of a right circular cone.

FIG. 16A is a plan view showing part of a prior art focusing screen having small spherical lenses, FIG. 16B is a partial cross section taken along a line IIIB—IIIB in FIG. 16A, and FIG. 16C is a partial cross section taken along a line IIIC—IIIC in FIG. 16A.

In FIGS. 16B and 16C, the focusing screen is indicated by 10, with individual small spherical lenses denoted by 12. In the example shown, small spherical lenses 12 are formed on the surface of the focusing screen 10, and as shown in FIG. 16A, a large number of small lenses 12 are disposed in a regular pattern to form a honeycomb structure.

FIG. 17a is a plan view showing part of a prior art focusing screen having small lenses of right circular conical shape, FIG. 17B is a partial cross section taken along a line IVB—IVB in FIG. 17A, and FIG. 17C is a partial cross section taken along a line IVC—IVC in FIG. 17A.

In FIGS. 17B and 17C, the focusing screen is indicated by 14, with individual conical lenses denoted by 16. In the embodiment shown, small lenses 16 of right circular conical shape are formed on the surface of the focusing screen 14, and as shown in FIG. 17A, a large number of small lenses 16 are disposed in a regular pattern to form a honeycomb structure.

A problem with such a focusing screen is that because of the presence of many asperities, shadows are prone to occur in some parts of the image formed on the screen and such shadows, being disagreeable to the viewer of the screen (i.e., the operator of the camera), sometime create an unpleasant sensation. These shadows become increasingly conspicuous as the imaging lens is stopped down to a narrow diaphragm opening.

In a conventional focusing screen made of ground glass (this type of focusing screen is referred to hereinafter simply as the former focusing screen), small asperities of different sizes are formed in a random pattern, as a result of which the shadows are more conspicuous than in a prior art focusing screen provided with a regular pattern of small lenses (this type of focusing screen is referred to hereinafter simply as the latter focusing screen). Although the intensity of the shadows produced in the latter focusing screen provided with a regular pattern of small lenses is reduced to a less conspicuous level than in the former focusing screen, an unclear image is still formed on the screen, and it has been difficult to reduce the disagreeable sensation to a level that is tolerable for practical purposes.

FIGS. 18 and 19 are spectrum characteristic diagrams of two prior art focusing screens provided with small spherical and conical lenses, respectively. Angles in degrees are plotted on the x and y axes of each diagram. The characteristic diagrams shown in FIGS. 18 and 19 were constructed by computer simulation of the spectral intensity light diffused by each focusing screen when a defocused image of a point source of light ($\lambda=550$ $\mu$m) is formed on the screen. The spectral intensity of light is shown to be proportional to the diameter of circles plotted in each diagram. The refractive indices of the optical materials of which the small lenses and the focusing screen are made are assumed to be equal to each other.

FIG. 18 shows the results of calculation with the pitch P and radius r assumed to be 20 $\mu$m and 34.083 $\mu$m, respectively. If the center of the sphere including the surface of a small spherical lens 12 and the radius of this sphere are written as Q and r, respectively, the pitch P denotes the distance between adjacent centers Q (see FIGS. 16A to 16C).

As is clear from FIG. 18, if small spherical lenses 12 are provided on a focusing screen, the spectral intensity of the first-order light is relatively low, whereas the intensity of the zero-order light is somewhat high, producing great variations in the spectral intensity of light, particularly in the third and lower orders of light.

FIG. 19 shows the results of calculation with the pitch P and angle $\Theta$ being assumed to be 20 $\mu$m and 10 degrees, respectively. If the axis of the right circular cone including the surface of a conical small lens 16 is written as S, the pitch P denotes the distance between adjacent axes S, and the angle $\Theta$ signifies the angle formed between line V normal to axis S and the sloping side of the right circular cone (see FIGS. 17A–17C).

As is clear from FIG. 19, if small lenses in the shape of a right circular cone are provided on a focusing screen, the spectral intensity of the first-order light is relatively low, again producing great variations in the spectral intensity of light, particularly in the third-and lower orders of light.

On the basis of these results of computer simulation, the present inventor surmised that the disagreeable sensation produced by unclear images formed on the prior art focusing screens are chiefly caused by the great variations in the spectral intensity of light.

SUMMARY OF THE INVENTION

An object, therefore, of the present invention is to provide a focusing screen that solves the aforementioned problems of the prior art by reducing the variations in the spectral intensity of light, in particular, the third and lower orders of light.

This and other objects of the present invention are generally attained by a focusing screen that is provided with a plurality of small lenses, each of which is a composite lens consisting of a concave lens portion and a convex lens portion.

In a preferred embodiment of the present invention, the plurality of small lenses are disposed in such a way as to form a honeycomb structure.

In another preferred embodiment of the present invention, each small lens is composed of a concave, lens portion in right circular conical form and a convex lens portion in right circular conical form, both lens portions having a common axis.

In still another embodiment of the present invention, each small lens has a concave lens portion of right circular conical shape disposed in the central portion of a convex lens portion of right circular conical shape, and each small lens satisfies the following conditions I:

$$0.2 < (R_B/R_A) < 0.4$$

$$85 < (n-1) \cdot P \cdot \Theta_2 < 115$$

$$0 < \Theta_2 < 2 \cdot \Theta_1$$

where:

n: the refractive index of the material of which each small lens is made;

P: the distance between adjacent common axes;

$R_A$: the distance from a common axis to the boundary between adjacent small lenses;

$R_B$: the distance from the common axis to the boundary between a concave lens portion and a convex lens portion;

$\Theta_1$: the angle formed between a line normal to the common axis and the sloping side of a convex lens portion; and $\Theta_2$: the angle formed between a line normal to the common axis and the sloping side of a concave lens portion.

Preferably $(n-1) \cdot P \cdot \Theta_1$ in conditions I is set to value of about 98.272.

In another preferred embodiment of the present invention, each small lens portion has a convex lens of right circular conical shape disposed in the central portion of a concave lens portion of right circular conical shape, and each small lens satisfies the following conditions II:

$$0.2 < (R_B/R_A) < 0.4$$

$$85 < (n-1) \cdot P \cdot \Theta_2 < 115$$

$$0 < \Theta_1 < 2 \cdot \Theta_2$$

where n: the refractive index of the material of which each small lens is made;

P: the distance between adjacent common axes;

$R_A$: the distance from common axis to the boundary between adjacent small lenses;

$R_B$: the distance from the common axis to the boundary between adjacent small lenses;

$\theta_1$: the angle formed between a line normal to the common axis and the sloping side of a convex lens portion, and $\theta_2$: the angle formed between a line normal to the common axis and the sloping side of a concave lens portion.

Preferably, $(n-1) \cdot P \cdot \Theta_2$ in conditions II is set to a value of about 98.272.

In still another embodiment of the present invention, the surface of each of the concave and convex lens portions is provided with asperities.

In accordance with the present invention, each of the small lenses formed on a focusing screen is a composite lens consisting of a concave lens portion and a convex lens portion. This offers the advantage that the spectrum characteristics of the focusing screen can be appropriately adjusted by changing the design parameters of the concave lens portion and convex lens portions.

DESCRIPTION OF THE PREFERRED EMBODIMENTS

Several embodiments of the present invention are described hereinafter with reference to the accompanying drawings, which are only schematic, and hence, should not be taken to limit the dimensions, geometry, and layout of the individual constituent elements of the lenses shown.

Figure 1A:
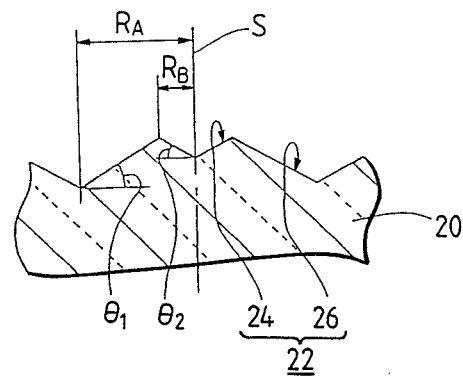
FIGS. 1A and 1B are cross sections showing schematically essential parts of a focusing screen constructed according to the first embodiment of the present invention.
Figure 1B:
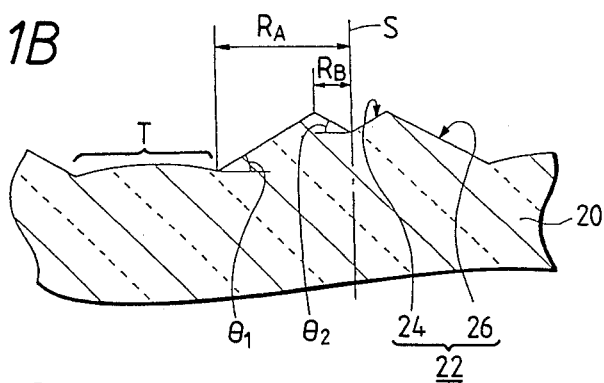
Figure 2:
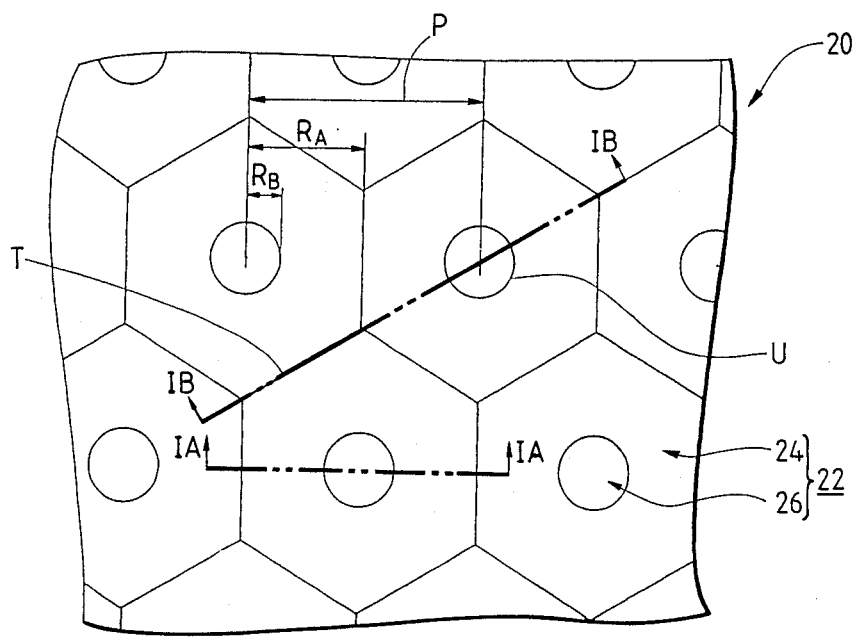
FIG. 2 is a plan view showing schematically part of the focusing screen of the first embodiment of the present invention.

FIGS. 1A and 1B are cross sections showing schematically essential parts of a focusing screen according to the first embodiment of the present invention. FIG. 2 is a plan view showing part of the focusing screen according to the first embodiment of the present invention. FIG. 1A is a cross section taken along a line IA—IA in FIG. 2, and FIG. 1B is a cross section taken along a line IB—IB in FIG. 2.

In FIGS. 1A and 1B, reference numeral 20 denotes a focusing screen composed of a glass substrate, or the like, having a surface provided with a plurality of small lenses. Reference numeral 22 signifies one of the small lenses. A concave lens portion is indicated by 24, and a convex lens portion by 26. The small lens 22 is a composite lens consisting of the lens portion 24 and 26.

As shown in FIGS. 1A and 1B, the first embodiment of the present invention is characterized in that the small lens 22 is composed of the concave lens portion 24 and convex lens portion 26 which have a common axis S, and are both in the form of a right circular cone, with the concave lens portion 24 being disposed in the central portion of the convex lens portion 26.

Details of the surfaces of the concave and convex lens portions in the first embodiment are described below. It is assumed that one right circular cone (the first cone) is tapered in a direction away from the focusing screen 20, and that another right circular cone (the second cone) is tapered in a direction toward the screen 20. The two cones have a common axis S, and cross each other in such a way that their apices align on the common axis. In this situation, the surface of the concave lens portion 24 is formed of the surface of the second cone in the portion which overlaps the first cone, and the surface of the convex lens portion 26 is formed of the surface of the first cone, except in the portion which overlaps the second cone.

As shown in FIG. 2, a plurality of small lenses 22 in the first embodiment are disposed in such a way as to form a honeycomb structure. The axes S of the small lenses 22 on the screen 20 are arranged in such a way that any three adjacent axes S will pass through points that substantially coincide with the apices of a equilateral triangle.

As is also clear from FIG. 2, the boundary T between adjacent small lenses 22 is positioned in such a way that many regular hexagons lie side-by-side to form a honeycomb structure. The shape of a cross section of the boundary T is arcuate and convex in a direction away from the screen 20 (as shown in part in FIG. 1B).

In order to make uniform the spectral intensity distribution of the third and lower orders of light, thereby reducing the variations in the spectral intensity of light, each of the small lenses 22 preferably is designed to satisfy the following conditions I (see FIGS. 1A and 1B and FIG. 2):

$$0.2 < (R_B/R_A) < 0.4$$

$$85 < (n-1) \cdot P \cdot \Theta_2 < 115$$

$$0 < \Theta_2 < 2 \cdot \Theta_1$$

where $n$: the refractive index of the material of which each small lens is made;

$P$: the distance between adjacent common axes S;

$R_A$: the distance from a common axis S to the boundary T between adjacent small lenses;

$R_B$: the distance from common axis S to the boundary U between a concave lens portion and a convex lens portion;

$\Theta_1$: the angle formed between a line V normal to the common axis S and the sloping side W of a convex lens portion; and $\Theta_2$: the angle formed between the line V normal to the common axis S and the sloping side X of a concave lens portion.

The spectral characteristics of a focusing screen having small lenses, that satisfy conditions I (design examples according to the first embodiment of the present invention) and the spectral characteristics of focusing screens having small lenses that do not satisfy conditions I (comparative examples) are described hereinafter. The design parameters of the respective examples are summarized in Table 1 below. The spectrum characteristic diagrams that ar to be used as references for the following description of the design and comparative examples were constructed by computer simulation as in the case of the prior art.

TABLE 1

| | P | n | RA | RB | Θ1 | Θ2 | RB/RA | $(n - 1) \cdot P \cdot \Theta_3$ |
|---|---|---|---|---|---|---|---|---|
| Design Example 1 | 20 | 1.49136 | — | — | 10 | 10 | 0.3 | 98.272 |
| Design Example 2 | 16 | 1.49136 | — | — | 12.5 | 12.5 | 0.3 | 98.272 |
| Comparative Example 1 | 20 | 1.49136 | 10 | 2 | 10 | 10 | 0.2 | 98.272 |
| Comparative Example 2 | 20 | 1.49136 | 10 | 4 | 10 | 10 | 0.4 | 98.272 |

TABLE 1-continued

| | P | n | RA | RB | Θ1 | Θ2 | RB/RA | $(n-1) \cdot P \cdot \Theta_3$ |
|---|---|---|---|---|---|---|---|---|
| Comparative Example 3 | 17.299 | 1.49136 | 8.650 | 2.595 | 10 | 10 | 0.3 | 85 |
| Comparative Example 4 | 23.406 | 1.49136 | 11.703 | 3.5109 | 10 | 10 | 0.3 | 115 |
| Comparative Example 5 | 20 | 1.49136 | 10 | 3 | 10 | 0 | 0.3 | — |
| Comparative Example 6 | 20 | 1.49136 | 10 | 3 | 10 | 20 | 0.3 | 98.272 |
| Modified Example | 20 | 1.49136 | 10 | 3 | 10 | 10 | 0.3 | 98.272 | and $R_B$ are in μm; $\Theta_1$ and $\Theta_2$ are in degree.

Design Example 1

Figure 3A:
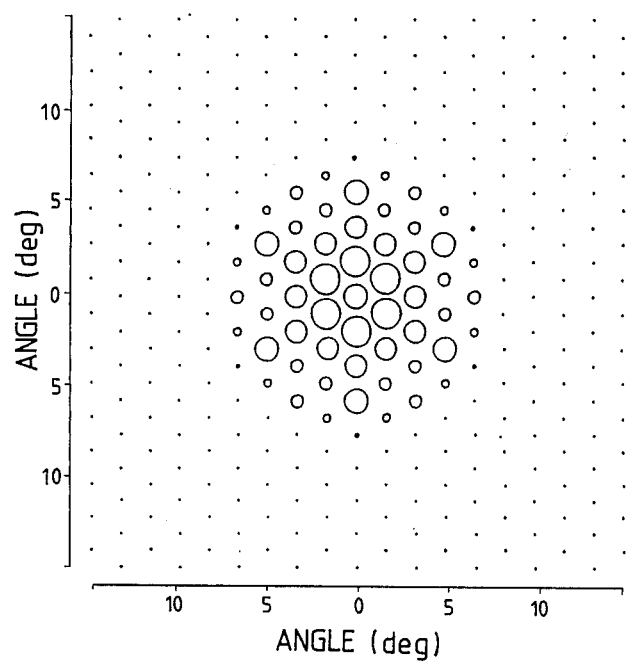
FIG. 3A is a spectrum characteristic diagram of Design Example 1 according to the first embodiment.
Figure 3B:
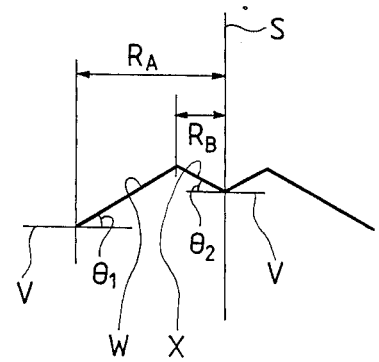
FIG. 3B shows diagrammatically the configuration of one of the small lenses formed in accordance with Design Example 1.

FIG. 3A is a spectrum characteristic diagram of Design Example 1, and FIG. 3B shows diagrammatically the configuration of one of the small lenses formed according to Design Example 1.

The design parameters of this example are set to the following values: P=20 μm; n=1.49136; $R_A$=10 μm; $R_B$=3 μm; and $\Theta_1=\Theta_2=10$ degrees ($R_B/R_A$=0.3 and $(n-1)\cdot P\cdot\Theta_1$=98.272) (see FIG. 3B).

Figure 18:
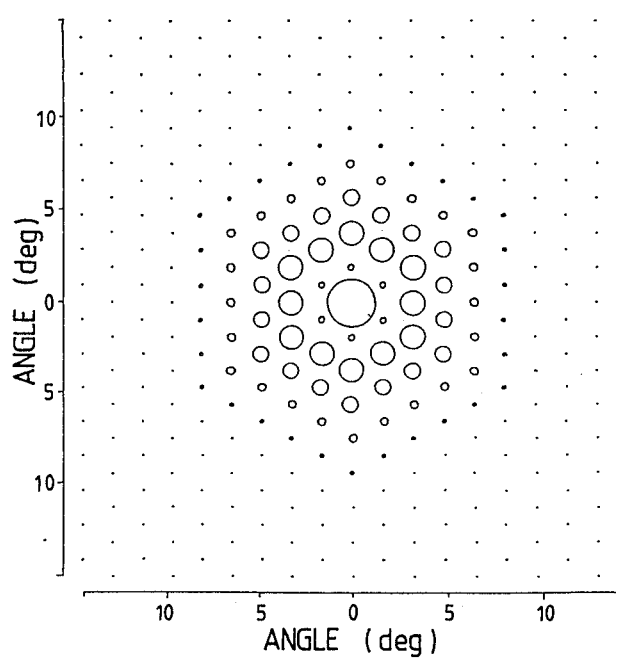
FIG. 18 is a diagram showing spectrum characteristics of the prior art focusing screen having small spherical lenses.
Figure 19:
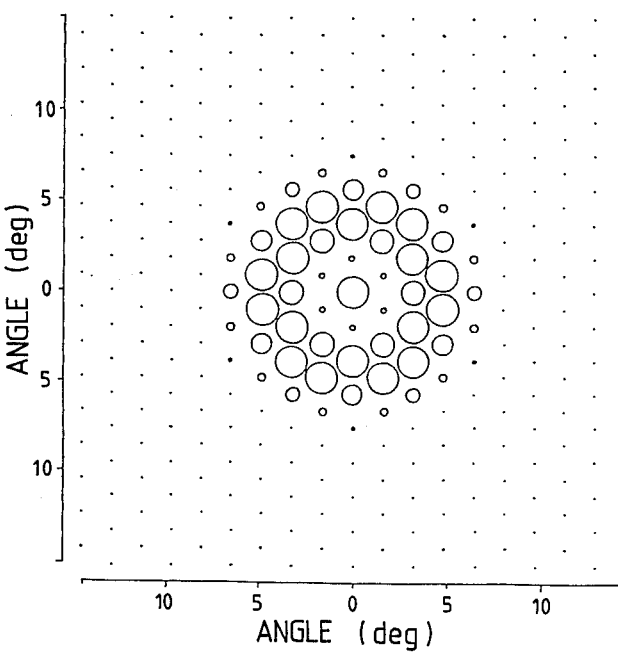
FIG. 19 is a diagram showing the spectrum characteristics of the prior art focusing screen having small lenses in right circular conical form.

As is clear from FIG. 3A, Design Example 1 provides better spectral characteristics than the prior art, and it will be understood that the spectral intensity distribution of light, in particular the third and lower orders of light, is made more uniform than in the prior art focusing screens (compare with FIGS. 18 and 19).

By making the spectral intensity distribution of light uniform and by reducing the variations in the intensity of light in the spectrum, the disagreeable sensation from an unsharp image on the focusing screen is reduced significantly in comparison with the prior art.

The computer simulation conducted by the applicant showed that the closer the value of $(n-1)\cdot P\cdot\Theta_1$ is to 98.272, the greater is the uniformity attained for the spectral intensity distribution of light so as thereby to attain a better balance. Therefore, it is preferable that $(n-1)\cdot P\cdot\Theta_2$ in conditions I be set to a value of about 98.272.

Design Example 2

Figure 4A:
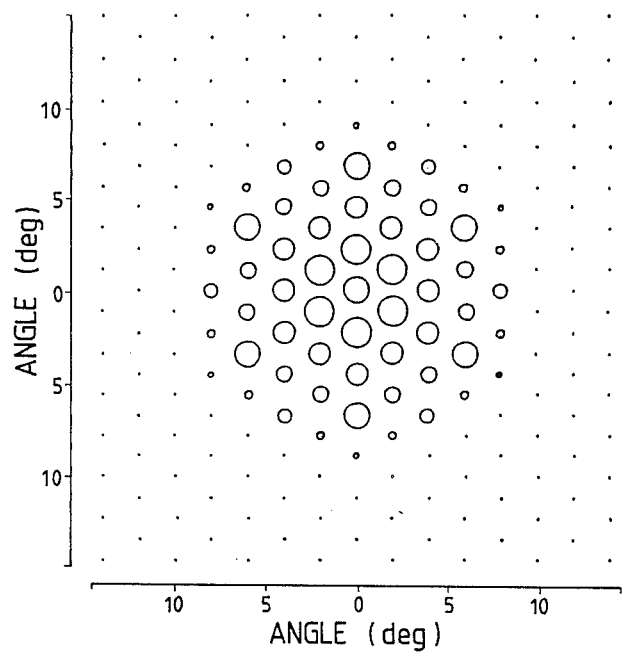
FIG. 4A is a spectrum characteristic diagram of Design Example 2 according to the first embodiment.
Figure 4B:
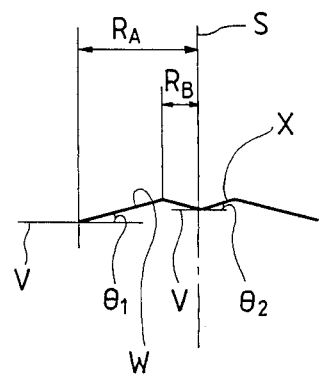
FIG. 4B shows diagrammatically the configuration of one of the small lenses formed in accordance with Design Example 2.

FIG. 4A is a spectrum characteristic diagram of Design Example 2, and FIG. 4B shows diagrammatically the configuration of one of the small lenses formed according to Design Example 2.

The design parameters of this example are set to the same values as in Design Example 1 except that P=16 μm, $R_A$=12.308 μm; $R_B$=3.692 μm, and $\Theta_1=\Theta_2=12.5$ degrees ($R_B/R_A$=0.3 and $(n-1)\cdot P\cdot\Theta_1$=98.272) (see FIG. 4B).

As is clear from FIG. 4A, Design Example 2 also provides better spectral characteristics than the prior art, and it will be understood that the spectral intensity distribution of light, in particular the third-and higher orders of light, is made more uniform than in the prior art focusing screens (cf. FIGS. 18 and 19).

In this example, the value of $(n-1)\cdot P\cdot\Theta_1$ in conditions I is set to a value of about 98.272 as in Design Example 1, but the values of $\Theta_1$ and $\Theta_2$ are made greater than in Design Example 1. Because of the greater, values of $\Theta_1$ and $\Theta_2$, the spectrum of light obtained is wider and more discrete than that obtained in Design Example 1. However, since the value of $(n-1)\cdot P\cdot\Theta_1$ is equal in both examples, there is no variation in the spectral intensity of light in these examples (cf. FIGS. 3A and 4A).

As is apparent from the data of Design Examples 1 and 2, focusing screens having appropriate diffusion and spectral characteristics can be fabricated by designing small lenses 22 on the focusing screen 20 in such a way that they satisfy conditions I. It is also possible to fabricate focusing screens that experience smaller variations in the spectral intensity of the third-and lower orders of light than in the prior art, and which cause a less disagreeable sensation to the operator on account of an imprecise image formed on the screen.

Description of the Numerical Range of $R_B/R_A$

Figure 5A:
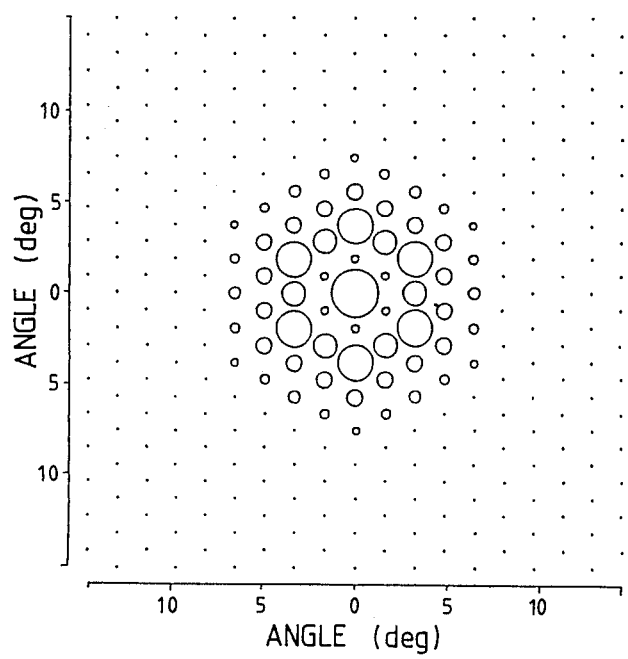
FIG. 5A is a spectrum characteristic diagram of Comparative Example 1 according to the first embodiment.
Figure 5B:
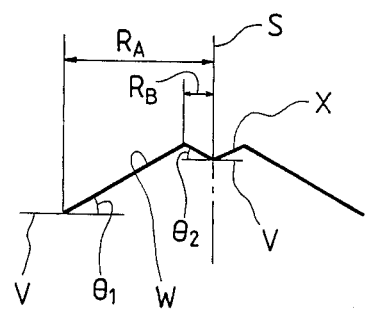
FIG. 5B shows diagrammatically the configuration of one of the small lenses formed in accordance with Comparative Example 1.

FIG. 5A is a spectrum characteristic diagram of Comparative Example 1, and FIG. 5B shows diagrammatically the configuration or one or the small lenses formed according to Comparative Example 1.

The design parameters of this comparative example are set to the same values as in Design Example 1 except that $R_A$=10 μm and $R_B$=2 μm ($R_B/R_A$=0.2).

As is clear from FIG. 5A, the spectral intensity of the first-order light obtained in Comparative Example 1 is relatively low, producing variations in the intensity of light in the spectrum.

Comparative Example 2

Figure 6A:
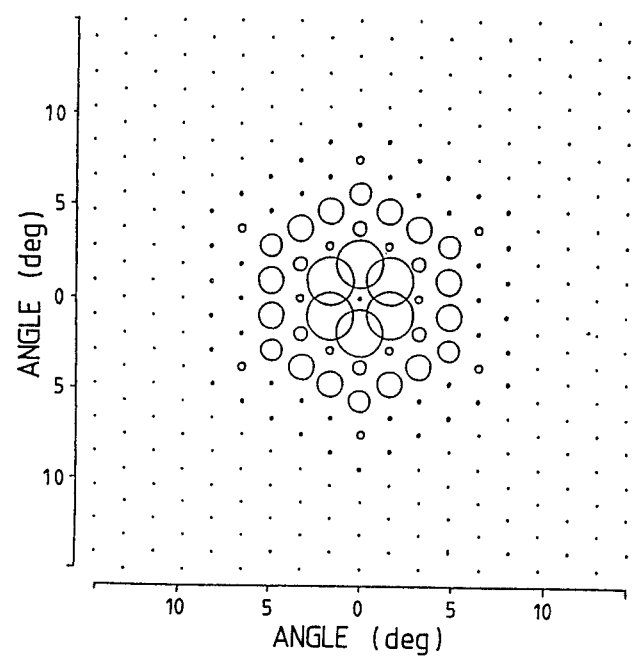
FIG. 6A is a spectrum characteristic diagram of Comparative Example 2 according to the first embodiment.
Figure 6B:
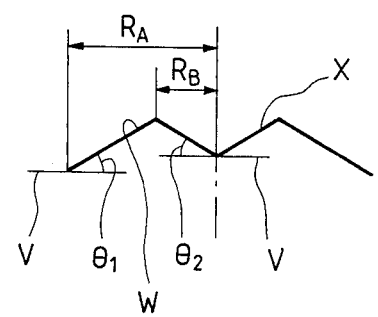
FIG. 6B shows diagrammatically the configuration of one of the small lenses formed in accordance with Comparative Example 2.

FIG. 6A is a spectrum characteristic diagram of Comparative Example 2, and FIG. 6B shows diagrammatically the configuration of one of the small lenses formed according to Comparative Example 2.

The design parameters of this comparative example are set to the same values as in Design Example 1 except that $R_A$=10 μm and $R_B$=4 μm ($R_B/R_A$=0.4).

As is clear from FIG. 6A, the spectral intensities of the zero- and second-order light are relatively low, whereas, the intensity of the first-order light is relatively high, thereby causing variations in the intensity of light in the spectrum.

As will be understood from the data of Comparative Examples 1 and 2, the value of $R_B/R_A$ is preferably set to be within the range of from 0.2 (not inclusive) to 0.4 (not inclusive). If this condition of $0.2 < R_B/R_A < 0.4$ is satisfied, the spectral intensity distribution of light can be made sufficiently uniform to reduce the unpleasant sensation caused by dark areas on the focusing screen.

Description of the Numerical Range of $(n-1)\cdot P\cdot\Theta_1$

Comparative Example 3

Figure 7A:
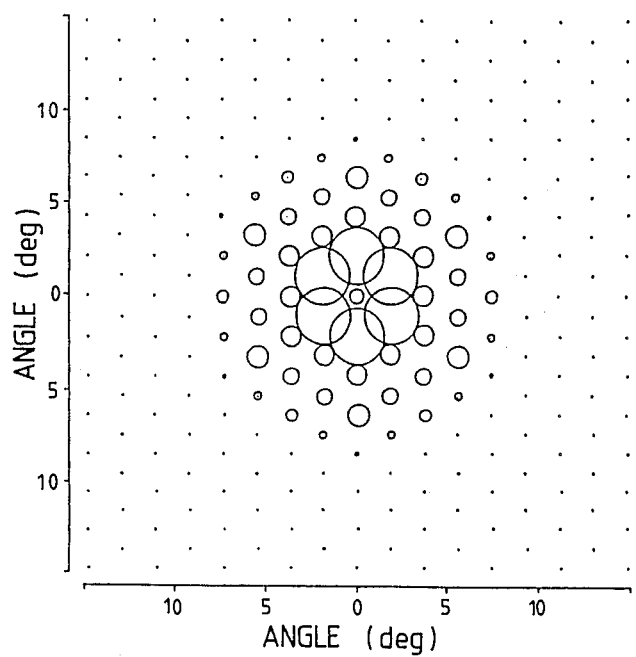
FIG. 7A is a spectrum characteristic diagram of Comparative Example 3 according to the first embodiment.
Figure 7B:
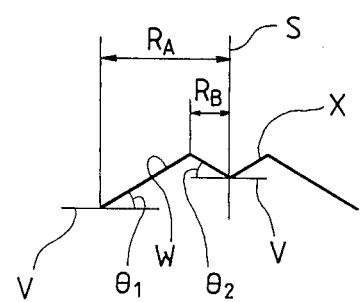
FIG. 7B shows diagrammatically the configuration of one of the small lenses formed in accordance with Comparative Example 3.

FIG. 7A shows a spectrum characteristic diagram of Comparative Example 3, and FIG. 7B shows diagrammatically the configuration of one of the small lenses formed according to Comparative Example 3.

The design parameters of this comparative example are set to the same values as in Design Example 1 except that P=17.299 μm, $R_A$=8.650 μm, and $R_B$=2.586 μm ($(n-1) \cdot P \cdot \Theta_1 = 85$).

As is clear from FIG. 7A, the spectral intensity of the second-order light obtained in Comparative Example 3 is relatively low, producing variations in the intensity of light in the spectrum.

Comparative Example 4

Figure 8A:
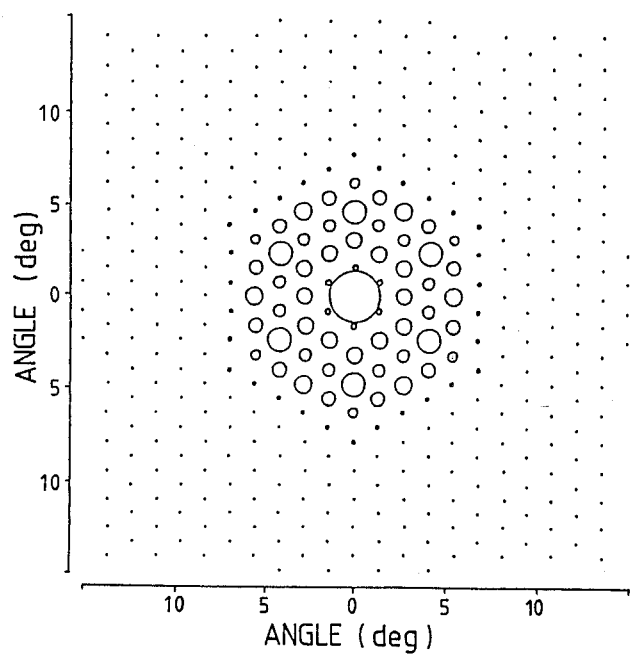
FIG. 8A is a spectrum characteristic diagram of Comparative Example 4 according to the first embodiment.
Figure 8B:
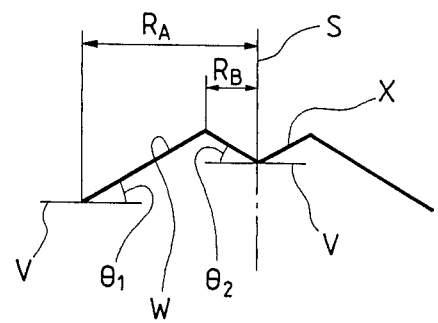
FIG. 8B shows diagrammatically the configuration of one of the small lenses formed in accordance with Comparative Example 4.

FIG. 8A is a spectrum characteristic diagram of Comparative Example 4, and FIG. 8B shows diagrammatically the configuration of one of the small lenses formed according to Comparative Example 4.

The design parameters of this comparative example are set to the same values as in Design Example 1 except that P=23.406 μm, $R_A$=11.703 μm, and $R_B$=3.511 μm ($(n-1) \cdot P \cdot \Theta_1 = 115$).

As is clear from FIG. 8A, the spectral intensity of the zero-order light obtained in Comparative Example 4 is relatively high, whereas the intensity of the first-order light is relatively low, thereby producing variations in the intensity of light in the spectrum. Because of the particularly high spectral intensity of the zero-order light, the image formed on the focusing screen of Comparative Example 4 is unclear, similar to the case of a picture taken with a soft-focus lens. Therefore, the focusing screen of Comparative Example 4 is not acceptable for the purposes of the present invention.

As will be understood from the data of Comparative Examples 3 and 4, the value of $(n-1) \cdot P \cdot \Theta_2$ is preferably set to be within the range of from 85 (not inclusive) to 115 (not inclusive). If this condition of $85 < (n-1) \cdot P \cdot \Theta_1 < 115$ is satisfied, the spectral intensity distribution of light can be made sufficiently uniform to reduce the unpleasant sensation caused by dark areas on the focusing screen.

Description of the Numerical Range $\Theta_2$

Comparative Example 5

Figure 9A:
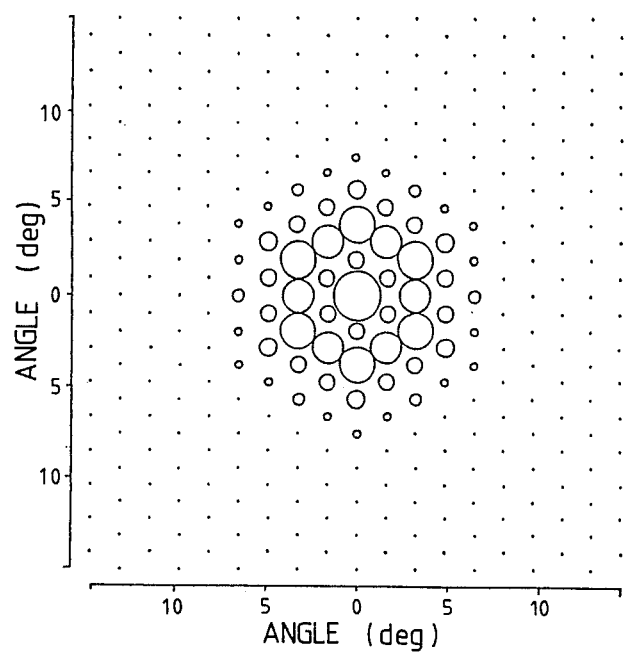
FIG. 9A is a spectrum characteristic diagram of Design Example 5 according to the first embodiment.
Figure 9B:
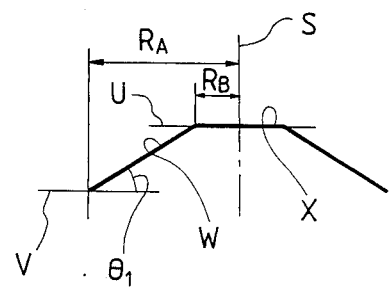
FIG. 9B shows diagrammatically the configuration of one of the small lenses formed in accordance with Design Example 5.

FIG. 9A is a spectrum characteristic diagram of Comparative Example 5, and FIG. 9B shows diagrammatically the configuration of one of the small lenses formed according to Comparative Example 5.

This comparative example is the same as Design Example 1 except that $\Theta_2$ is 0 degrees; in other words, the portion of a small lens which is concave in Design Example 1 is made flat in Comparative Example 5. Because of this difference, the definitions of the symbols used in FIGS. 1 and 2 should be changed to the following as far as Comparative Example 5 is concerned: S, the axis of a convex lens portion; P, the distance between adjacent axes S; $R_A$, the distance from axis S and the boundary between adjacent small lenses; $R_B$, the distance from axis S and the boundary between the convex lens portion and the flat portion; $\Theta_1$, the angle formed between line V normal to the axis S and the sloping side W of the convex lens portion; and $\Theta_2$, the angle formed between line V and the flat portion (see FIG. 9B).

As is clear from FIG. 9A, in Comparative Example 5 where $\Theta_2$ is zero degrees, the intensity of the first-order light is relatively low and variations occur in the spectral intensity distribution.

Comparative Example 6

Figure 10A:
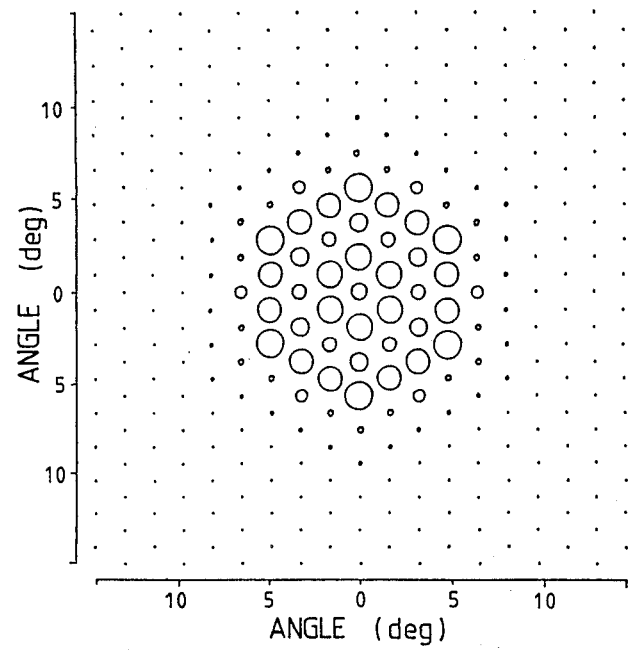
FIG. 10A is a spectrum characteristic diagram of Design Example 6 according to the first embodiment.
Figure 10B:
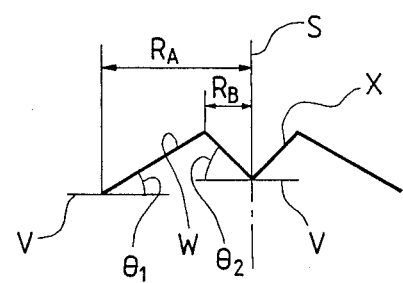
FIG. 10B shows diagrammatically the configuration of one of the small lenses formed in accordance with Design Example 6.

FIG. 10A is a spectrum characteristic diagram of Comparative Example 6, and FIG. 10B shows diagrammatically the configuration of one of the small lenses formed according to Comparative Example 6.

The design parameters of this comparative example are set to the same values as in Design Example 1 except that $\Theta_2$ is 20 degrees.

As is clear from FIG. 10A, Comparative Example 6 retains the advantage that the variations in the spectral intensity of the third-and higher order light can be reduced to relatively small levels. However, since $\Theta_2$ is equal to twice the value of $\Theta_1$, ($\Theta_2 = 2 \cdot \Theta_1$), the fourth- and higher order spectral components of the light are increased in comparison with Design Examples 1 and 2 and Comparative Examples 1-5. As a result, the image formed on the focusing screen will result in light shadows being formed around dark shadows. Such light and dark shadows produce a certain degree of imprecision in the image, which therefore appears unnatural to the viewer.

As will be understood from the data of Comparative Examples 5 and 6, the value of $\Theta_2$ is preferably set to be within the range of from zero to twice the value of $\Theta_1$. If this condition of $0 < \Theta_2 < 2 \cdot \Theta_1$ is satisfied, the spectral intensity of light can be made sufficiently uniform to reduce the unpleasant or disagreeable sensation caused by dark areas on the focusing screen.

Modified Example

In the first embodiment of the present invention described above, the small lenses on the focusing screen are formed in an ideal state in that the boundary between the concave lens portion and convex lens portion of each small lens has a sharp edge. However, with current manufacturing technology, it can be expected that the boundary between the concave and convex lens portion may sometimes be a dull, rather than a sharp, edge.

The following is a description of a focusing screen that is provided with small lenses having a dull-edged boundary between concave and convex lens portions. This is essentially a modification of the first embodiment.

Figure 11A:
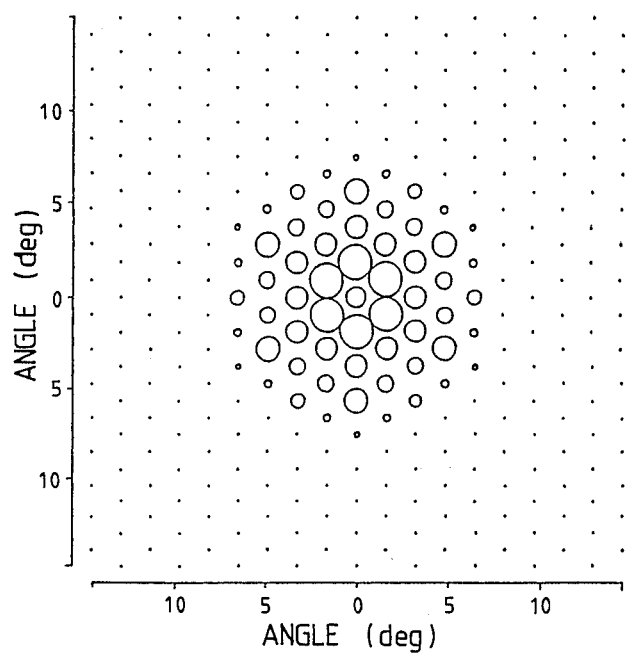
FIG. 11A is a spectrum characteristic diagram of a modified example of the first embodiment.
Figure 11B:
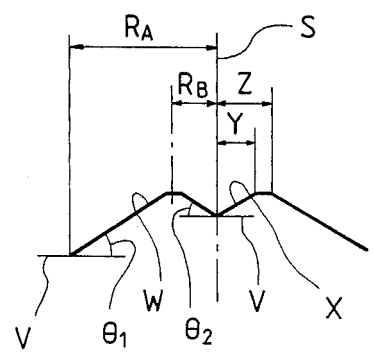
FIG. 11B shows diagramatically the configuration of one of the small lenses formed in accordance with this modification.

FIG. 11A is a spectrum characteristic diagram of this modified version of the first embodiment, and FIG. 11B shows diagrammatically the configuration of one of the small lenses formed according to this modification.

In the modified version under discussion, the boundary between the concave and convex lens portions of each small lens on the focusing screen is made flat. The design parameters of this modification are set to the same values as in Design Example 1 except that the distances Y and Z are 2.5 μm and 3.5 μm, respectively, where Y denotes the distance from common axis S to the boundary between the flat portion and the concave lens portion, and Z signifies the distance from the common axis S to the boundary between the flat portion and the convex lens portion (see FIG. 11B).

As is clear from FIG. 11A, the spectral intensity of the first-order light obtained in the modified version is relatively high although the increase is slight. Nevertheless, the variation in the spectral intensity of light is very small as compared with the prior art focusing screens, and the disagreeable sensation caused by dark areas can be reduced to smaller levels than in the prior art focusing screens. The design parameters of this modified versions are noted in Table 1 together with those of Design Examples 1 and 2 and Comparative Examples 1–6.

Second Embodiment

Figure 12A:
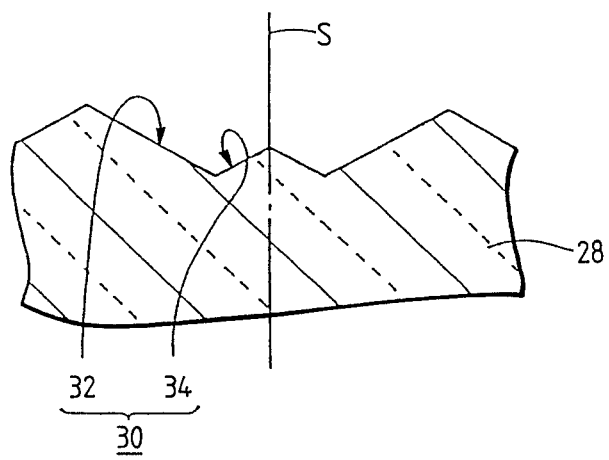
FIGS. 12A and 12B are cross sections showing schematically essential parts of a focusing screen according to a second embodiment of the present invention.
Figure 12B:
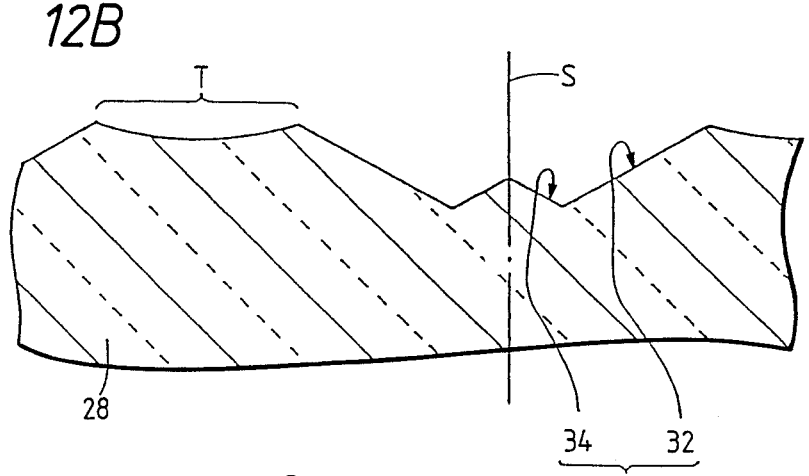
Figure 12C:
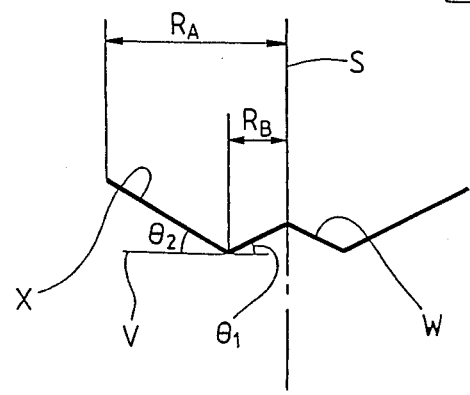
FIG. 12C shows diagrammatically one of the small lenses formed in accordance with the second embodiment.
Figure 13:
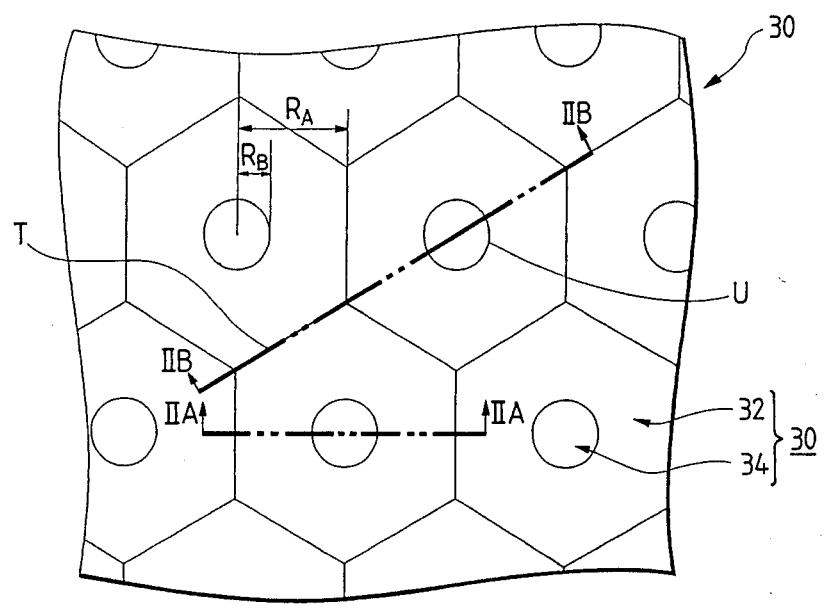
FIG. 13 is a plan view showing schematically part of the focusing screen according to the second embodiment.

FIGS. 12A and 12B are cross sections showing schematically essential parts of a focusing screen constructed according to the second embodiment of the present invention. FIG. 12C shows diagrammatically one of the small lenses formed on the focusing screen according to the second embodiment of the present invention. FIG. 13 is a plan view showing part of the focusing screen according to the second embodiment of the present invention. FIG. 12A is a cross section taken along a line IIA—IIA in FIG. 13, and FIG. 12B is a cross section taken along a line IIB—IIB in FIG. 13.

In FIGS. 12A and 12B, reference numeral 28 denotes a focusing screen provided with a plurality of small lenses, and 30 signifies one of the small lenses. A concave lens portion is indicated by 32, and a convex lens portion is indicated by 34. The small lens 30 is a composite lens consisting of the lens portions 32 and 34.

As shown in FIGS. 12A and 12B, the second embodiment of the present invention is characterized in that the small lens 30 is composed of the concave lens portion 32 and convex lens portion 34 which have a common axis S, and are both in the form of a right circular cone, with the convex lens portion 34 being disposed in the central portion of the concave lens portion 32.

Details of the surfaces of the concave and convex lens portions in the second embodiment are described below. It is assumed that one right circular cone (the first cone) is tapered in a direction away from the focusing screen 28, and that another right circular cone (the second cone) is tapered in a direction toward the screen 28. The two cones have a common axis S and cross each other in such a way that their apices align on the common axis. In this case, the surface of the convex lens portion 34 is formed of the surface of the first cone in the portion which overlaps the second cone, and the surface of the concave lens portion 32 is formed of the surface of the second cone except in the portion which overlaps the first cone.

As shown in FIG. 13, a plurality of small lenses 30 in the second embodiment are disposed in such a way as to form a honeycomb structure. As is also clear from FIG. 13, the boundary T between adjacent small lenses 30 is arranged in such a way that many regular hexagons lie side-by-side to form a honeycomb structure. The shape of the cross section of the boundary T is arcuate and convex in a direction away from the screen 28 (as shown in part in FIG. 12B).

In order to make uniform the spectral intensity distribution of the third-and lower orders of light, thereby reducing the variations in the spectral intensity of light, each of the small lenses 30 preferably is designed to satisfy the following conditions II (see FIGS. 12C and 13):

$$0.2 < (R_B/R_A) < 0.4$$

$$85 < (n-1) \cdot P \cdot \Theta_2 < 115$$

$$0 < \Theta_1 < 2 \cdot \Theta_2$$

where $n$: the refractive index of the material of which each small lens is made;

$P$: the distance between adjacent common axes S;

$R_A$: the distance from a common axis S to the boundary T between adjacent small lenses;

$R_B$: the distance from a common axis S to the boundary U between a concave lens portion and a convex lens portion;

$\Theta_1$: the angle formed between a line V normal to the common axis S and the sloping side W of a convex lens portion; and $\Theta_2$: the angle formed between line V normal to the common axis S and the sloping side X of a concave lens portion.

In the second embodiment of the present invention, it is preferable for $(n-1) \cdot P \cdot \Theta_2$ in conditions II to be set to a value of about 98.272. The closer the value of $(n-1) \cdot P \cdot \Theta_2$ is to 98.272, the greater is the uniformity of the spectral intensity distribution of light thereby to thereby attain a better balance.

The small lens 30 in the second embodiment differs from the small lens 22 in the above-described first embodiment in that the positional relationship between the concave and convex lenses is reversed. As for focusing screens provided with a plurality of small lenses, it is generally well known that the same spectral characteristics are obtained even if the positional relationship between concave and convex lenses is reversed. Therefore, the spectrum characteristics obtained in the second embodiment are the same as those attained in the first embodiment, and because of the resulting uniformity in the spectral intensity of light, the disagreeable sensation due to dark areas on the focusing screen can be reduced to a smaller level than has been observed with the prior art focusing screens.

Third Embodiment

Figure 14:
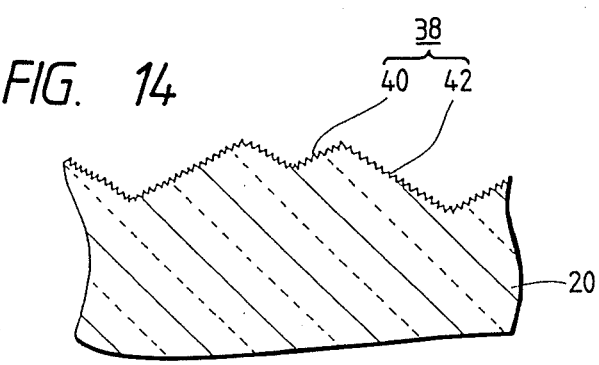
FIG. 14 is a cross section showing schematically essential parts of a focusing screen according to a third embodiment of the present invention.

FIG. 14 is a cross section that shows essential parts of a focusing screen constructed according to the third embodiment of the present invention and is a view similar to FIG. 1A. The constituent elements that are the same as those shown in the first embodiment are identified by like reference numerals.

In FIG. 14 reference numeral 38 denotes a small lens, and 40 and 42, a concave lens portion and a convex lens portion, respectively. The small lens 38 is a composite lens consisting of the lens portion 40 and 42.

The third embodiment of the present invention is characterized in that the surfaces of the concave lens portion 40 and convex lens portion 42 are provided with asperities. The lens portions 40 and 42 may be formed by etching the surfaces of the concave lens portion 24 and convex lens portion 26 in the first embodiment so as to roughen their surfaces. As a result, the lens portion 40 and 42 can in a macroscopic sense be formed under substantially the same conditions as those employed to fabricate the concave lens portion 24 and convex lens portion 26 in the first embodiment. This enables the focusing screen of the third embodiment to produce the same spectrum characteristics as those attained in the first embodiment. Therefore, in the third embodiment too the spectral intensity distribution of light also can be made uniform to such an extent that the disagreeable sensation caused by dark areas on the focusing screen are reduced to a smaller level than in the prior art.

Moreover, the grained surfaces of the lens portion 40 and 42 offer the advantage of producing a spectrum of light which is similar to that obtained in Design Example 2 according to the first embodiment in that it is wider and more discrete than, the spectrum produced in Design Example 1. Such a wide spectrum is effective in further reducing the disagreeable sensation that might otherwise occur due to dark areas on the focusing screen.

Figure 15:
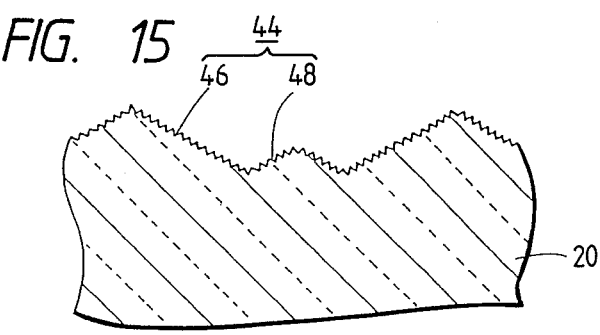
FIG. 15 is a cross section showing schematically essential parts of a focusing screen according to another example of the third embodiment.
Figure 16A:
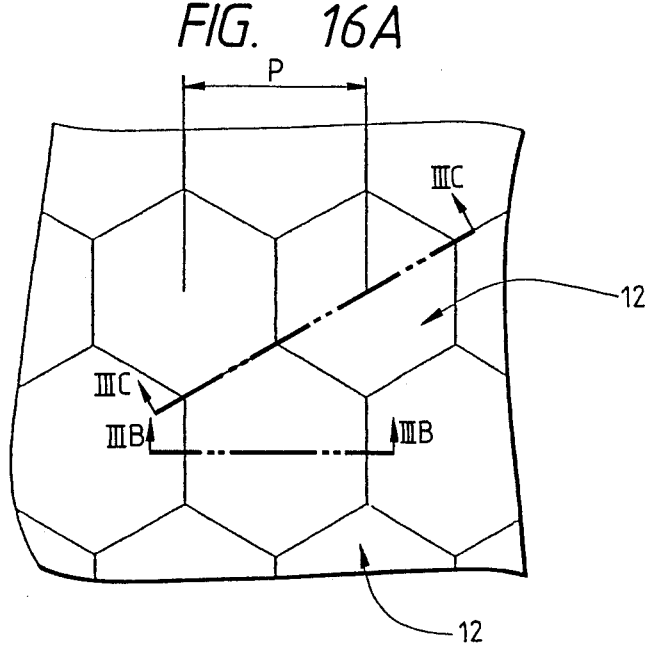
FIG. 16A is a plan view showing schematically part of a prior art focusing screen having small spherical lenses.
Figure 16B:
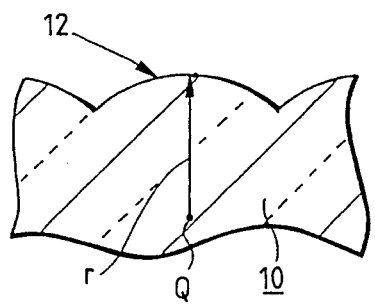
FIGS. 16B and 16C are cross sections showing schematically essential parts of this prior art focusing screen.
Figure 16C:
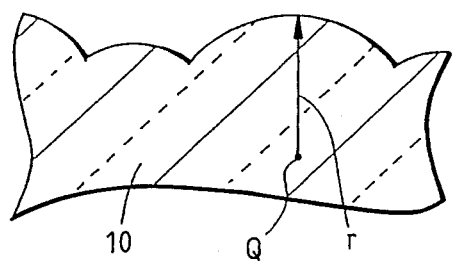
Figure 17A:
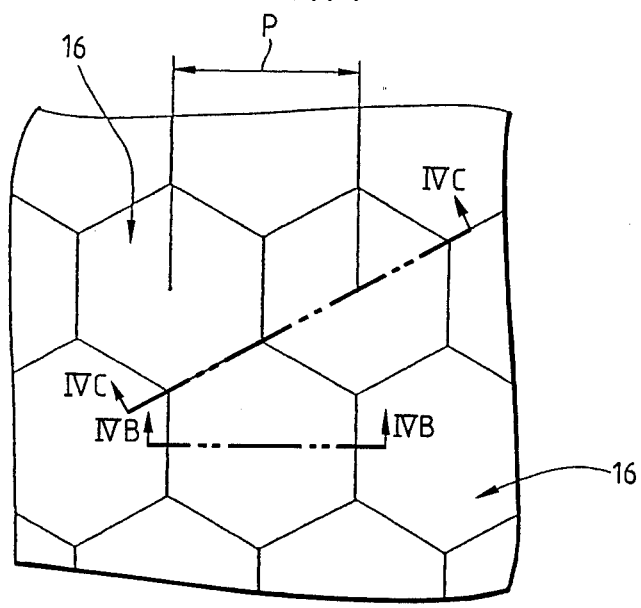
FIG. 17A is plan view showing schematically part of another prior art focusing screen having small lenses of right circular conical shape.
Figure 17B:
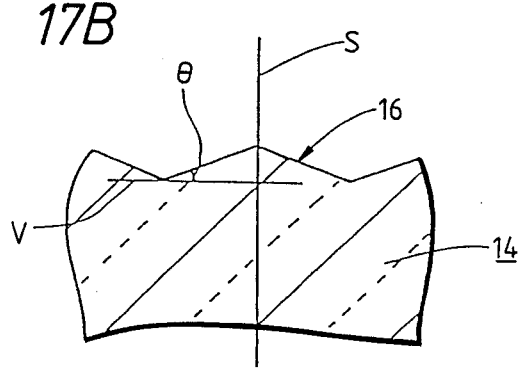
FIGS. 17B and 17C are cross sections showing schematically essential parts of this prior art focusing screen.
Figure 17C:
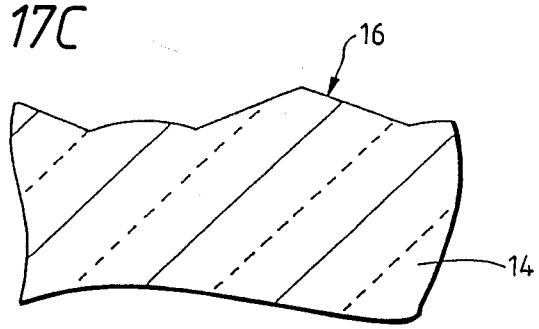

FIG. 15 is a cross section that shows essential parts of a focusing screen constructed according to another example of the third embodiment and which is a view similar to FIG. 12A. The constituent elements that are the same as those shown in the second embodiment are identified by like reference numerals.

In FIG. 15, reference numeral 44 denotes a small lens, and 46 and 48 a concave lens and a convex lens portion, respectively. The small lens 44 is a composite lens consisting of the lens portion 46 and 48.

This example is also characterized in that the surfaces of the concave lens portion 46 and convex lens portion 48 are provided with asperities. These lens portions 46 and 48, may be formed by etching the surfaces of the and concave lens portion 32 and convex lens portion 34 in the second embodiment so as to roughen their surfaces. As a result, the lens portions 46 and 48, can in a macroscopic sense be formed under substantially the same conditions as those employed to fabricate the concave lens portion 32 and convex lens portion 34 in the second embodiment. Therefore, as in the second embodiment, the spectral intensity distribution of light can be made uniform to such an extent that the disagreeable sensation caused by dark areas on the focusing screen is reduced to a smaller level than in the prior art.

Moreover, the grained surfaces of the lens portions 46 and 48 also offer the advantage of producing a wide spectrum of light that is effective in further eliminating the dark areas.

The present invention is by no means limited to the embodiments described above and it should be understood that the geometry, dimensions, layout, and numerical conditions of the individual components may be changed or modified as appropriate according to a specific design.

Advantages of the Invention

As will be understood from the foregoing description, each of the small lenses formed on the focusing screen of the present invention is a composite lens consisting of a concave lens portion and a convex lens portion. This offers the advantage that the spectrum characteristics of the focusing screen can be appropriately adjusted by changing the design parameters of the concave and convex lens portion. This offers in such a way as to reduce the variations that might occur in the spectral intensity of at least the third and lower orders of light. As a result, the operator of the camera will be provided with a clearer and more precise image than in the case of the prior art.

What is claimed is:
1. A focusing screen comprising:
a substrate; and
a plurality of small lenses formed on a surface of said substrate, each of said small lenses being a composite lens comprising a concave lens portion in right circular conical form and a convex lens portion in right circular conical form, both lens portions having a common axis.

2. The focusing screen according to claim 1, wherein said plurality of small lenses are disposed in such a way as to form a honeycomb structure.

3. The focusing screen according to claim 1, wherein each of said small lenses comprises a concave lens portion of right circular conical shape disposed in a central portion of a convex lens portion of right circular conical shape, each of said small lenses satisfying the following conditions I:

$$0.2 < (R_B/R_A) < 0.2$$

$$85 < (n-1) \cdot P \cdot \Theta_1 < 115$$

$$0 < \Theta_2 < 2 \cdot \Theta_1$$

where
n: the refractive index of the material of which each small lens is made;
P: the distance between adjacent common axes;
$R_A$: the distance from a common axis to the boundary between adjacent small lenses;
$R_B$: the distance from the common axis to the boundary between a concave lens portion and a convex lens portion;
$\Theta_1$: the angle formed between a line normal to the common axis and the sloping side of a convex lens portion; and
$\Theta_2$: the angle formed between a line normal to the common axis and the sloping side of a concave lens portion.

4. The focusing screen according to claim 3, wherein $(n-1) \cdot P \cdot \Theta_1$ in conditions I is set to a value of about 98.272.

5. The focusing screen according to claim 1, wherein each of said small lenses comprises a concave lens portion of right circular conical shape disposed in a central portion of a convex lens portion of right circular conical shape, each of said small lenses satisfying the following conditions I:

$$0.2 < (R_B/R_A) < 0.4$$

$$85 < (n-1) \cdot P \cdot \Theta_2 < 115$$

$$0 < \Theta_2 < 2 \cdot \Theta_2$$

where
n: the refractive index of the material of which each small lens is made;
P: the distance between adjacent common axes;
$R_A$: the distance from a common axis to the boundary between adjacent small lenses;
$R_B$: the distance from the common axis to the boundary between a concave lens portion and a convex lens portion;
$\Theta_1$: the angle formed between a line normal to the common axis and the sloping side of a concave lens portion; and
$\Theta_2$: the angle formed between a line normal to the common axis and the sloping side of a concave lens portion.

6. A focusing screen according to claim 5, wherein $(n-1) \cdot P \cdot \theta_2$ in conditions II is set to a value of about 98.272.

7. A focusing screen according to claim 1, wherein the surface of each of said concave lens portion and convex lens portion is provided with asperities.

* * * * *